United States Patent [19]

Skinner et al.

[11] 4,434,891
[45] Mar. 6, 1984

[54] DISC PACKAGE

[75] Inventors: James R. Skinner, Saratoga; Robert G. Atwood, Redwood City, both of Calif.

[73] Assignee: M.U. Engineering & Mfg., Inc., Mountain View, Calif.

[21] Appl. No.: 476,475

[22] Filed: Mar. 18, 1983

[51] Int. Cl.³ .................. G11B 1/02; B65D 85/57; B65D 81/18; B65D 53/02

[52] U.S. Cl. .................. 206/444; 206/205; 206/524.8; 220/378; 220/357; 277/205

[58] Field of Search .................. 206/444, 205, 524.8; 220/357, 378; 277/205

[56] References Cited

U.S. PATENT DOCUMENTS

| | | | |
|---|---|---|---|
| 2,242,686 | 5/1941 | Tirrell | 206/205 |
| 2,818,287 | 12/1957 | Josephson | 277/205 |
| 3,432,066 | 3/1969 | Posso | 220/357 |
| 3,543,922 | 12/1970 | Charlton | 206/444 |
| 3,943,987 | 3/1976 | Rossi | 206/524.8 |
| 4,206,499 | 6/1980 | Urbanek et ak. | 220/378 |
| 4,339,037 | 7/1982 | Doering | 206/444 |

Primary Examiner—William T. Dixson, Jr.
Attorney, Agent, or Firm—Fliesler, Dubb, Meyer & Lovejoy

[57] ABSTRACT

A disc package (10) includes a generally circular base (18), a core (34) extending upwardly from the base (18), and a cover (44) having a peripheral skirt (48) extending to a lower rim portion (50). The circular top is fastenable to the upper end portion (38) of the core (34). A resilient gasket (80) is removably attached to the lower rim portion (50) of the peripheral wall (26) and provides pressed resilient slidably sealing contact to prevent entry of dust into the disc package. Structures are also provided whereby the interior of the disc package (10) can be filled with a dust free gas. A plurality of covers (44) can be stacked, one atop another, without seizing to one another. Low outgassing materials are utilized to protect the stored discs (12a-12z) from damage.

18 Claims, 6 Drawing Figures

DISC PACKAGE

DESCRIPTION

Technical Field

The invention is concerned with a package for storing a plurality of discs and more specifically, the invention is concerned with a package for storing what are commonly known as hard or rigid computer memory discs.

Prior Art

Prior disc storage packages have generally included a base which has a cylindrical core extending perpendicularly upwardly. A compressible ring is generally attached to the base. The rigid discs, which have a central opening, are stacked about the core with intermediate spacer rings to keep them from damaging each other and a cover is then placed over the base with the edge of the cover bearing against the resilient ring. A screw type fastener is fastened down through the cover and into the top of the core and tightened sufficiently to cause an annular lip portion of the cover to bear against the topmost spacer and thereby to compress the discs between the base and the cover and to form a dust free seal between the resilient ring and the edge of the cover. Such packages are described in U.S. Pat. Des. Nos. 258,203 issued Feb. 10, 1981 and Des. 265,777 issued.

In another prior art disc package (see FIG. 6) the resilient ring is eliminated and the cover is made of a butadiene-styrene copolymer having a small amount of butadiene, the butadiene providing very limited flexibility for dust type sealing. In such disc packages the base generally has a peripheral wall which extends a small distance upwardly adjacent its periphery and against which bears a thin annular or lip ridge internal of and integral with the cover. The cover is essentially a rigid plastic and only quite limited flexibility exists at the thin lip which flexes outwardly where it contacts the wall. If the cover is moved upwardly only a small distance relative to the base, complete annular contact is lost.

A number of problems exist with such prior art packages. Since the discs which are being stored vary somewhat in thickness, and since the spacers which are positioned between each of such discs also vary somewhat in thickness, the overall thickness of a stack of twenty-five discs and twenty-six spacers (the standard size package currently used in the industry holds this number of discs and spacers) varies considerably in thickness. As a result, when the cover is screwed down against the core and in bearing relationship with the topmost of the spacers, the lower edge of the skirt of the cover varies in its relative relation to the base by as much as ± about 3 centimeters. As a result, in some instances a proper dust seal is not attainable with either of the prior art disc packages as described above.

Another problem with the prior art apparatus is that the discs are very sensitive to potential contamination. And, the metal bolts which are used to fasten the cover to the top of the core will generally be outgassing considerably. In the case of the covers being made of butadiene-styrene copolymer, the copolymer itself can outgas significantly and cause damage to the magnetic media on the discs.

The covers of the various disc packages of the prior art are generally stackable, one against another in tight mating relationship. This is useful in providing very compact storage but it creates a significant problem since adjacent covers often seize together and cannot be readily dislodged, thus, at times, leading to damaging of the covers.

A still further problem with the prior art apparatus is that the cores are generally molded integrally with the bases whereby each disc package is useful only with discs having a single sized central opening.

Still another problem with the discs packages of the prior art is that they are all filled with air which has corrosive properties due to the presence of oxygen and moisture and which can potentially harm the coatings on the discs.

An improved disc package which had none of the above set out drawbacks of prior art disc packages would clearly be of value.

Disclosure Of Invention

In one aspect of the present invention a package is provided for storing a plurality of discs having central openings. The package includes a generally circular base having a bottom surface adapted to be supported above a support surface and a top surface having a peripheral portion having a peripheral wall extending generally upwardly a spaced distance from the top surface. The base has a central portion having a core accepting structure. The package also includes a core having a lower end portion supported by the core accepting structure and an upper end portion extending generally upwardly away from the top surface. A cover is provided having a generally circular top and a peripheral skirt extending downwardly therefrom to a lower rim portion adjacent the wall. Means are provided for fastening the circular top to the upper end portion. A resilient gasket is provided which is removably attached to a respective one of a lower rim portion in the wall and which slidably sealingly bears against a respective other of the lower rim portion and the wall.

In accordance with another embodiment of the present invention a package is provided for a plurality of discs having central openings. The package includes a generally circular base having a bottom surface adapted to be supported above a support surface and a top surface having a peripheral portion. The base also has a central portion having a core accepting structure. A core has a lower end portion supported by the core accepting structure and an upper end portion extending generally upwardly away from the top surface. A cover is provided having a generally circular top and a peripheral skirt extending downwardly therefrom to a lower rim portion. Means are provided for fastening the circular top to the upper end portion. Sealing means are provided for sealing the lower rim portion to the circular base. The package further includes first and second ports therethrough along with valving means for closing the first port and relief valve means for preventing flow into the second port and for allowing flow out of the second port when pressure in the package exceeds pressure external of the package.

In accordance with yet another embodiment of the present invention a cover of a disc package includes an upper shoulder adjacent its circular top and a lower shoulder intermediate the upper shoulder and a lower rim portion of the skirt thereof and the skirt includes means for allowing stacking of a plurality of the covers while preventing seizing of adjacent covers to one another.

A disc package as set out above provides significant advantages over prior art disc packages. For example, use of a resilient gasket attached to either the lower end portion of the peripheral skirt of the cover or to a peripheral wall which extends generally upwardly a spaced distance from the top surface of the base provides good sealing even when the combination of discs and spacers within the package varies in height by as much as a quarter of an inch. This allows disc packages to be used which are significantly larger than those presently used; for example, disc packages can be used which store as many as forty discs, instead of the twenty-five disc packages of the prior art, while preserving good sealing.

When first and second ports are provided through the package along with valving means normally closing the first port and relief valve means for preventing flow into the second port but allowing flow out of the second port, a very clean atmosphere of a selectable composition (e.g., dust free, moisture free and inert) can be maintained in contact with the discs. When means are provided for allowing stacking of a plurality of covers while preventing seizing of adjacent covers to one another the problem of covers seizing to one another and resultant damage is eliminated.

Through use of non-metallic materials for fastening the cover to the core and through use of low out gassing materials for the cover, the gasket, and the valves, where present, outgassing can be kept to an acceptably low level.

Best Mode For Carrying Out Invention

While the present invention is discussed in following in detail with respect to a package for storing rigid discs having magnetic or optical reading capabilities for use with computers, the invention is not meant to be limited thereby since the invention is useful for storage of other discs as well.

Figure 1:
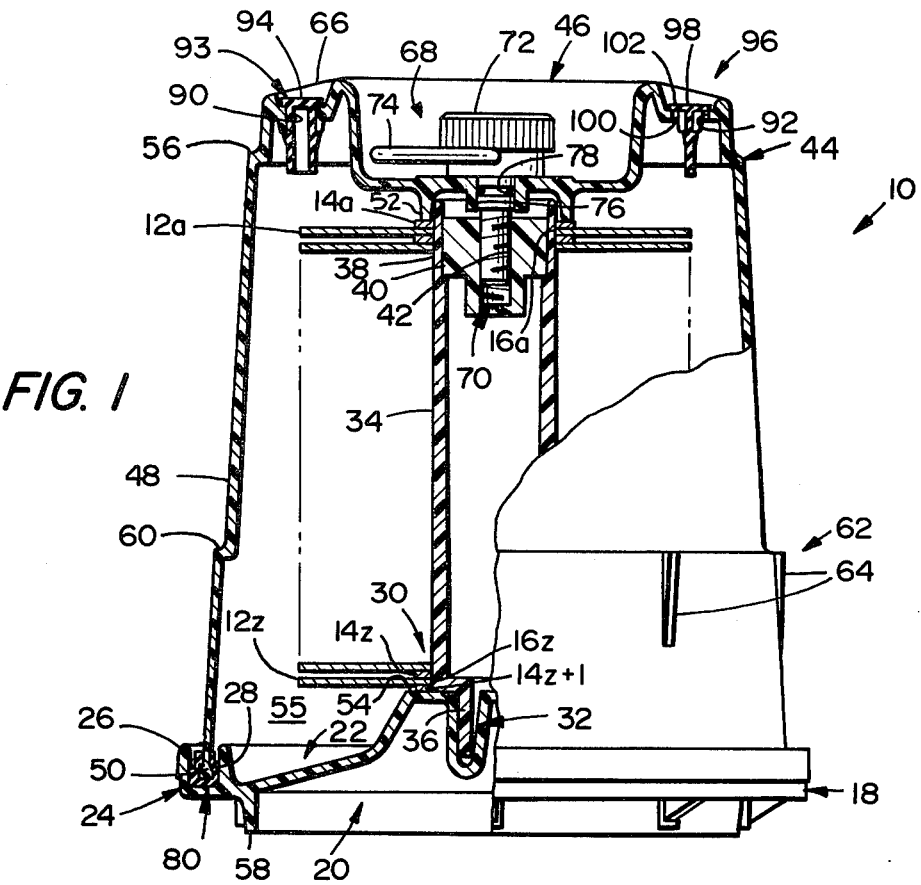
FIG. 1 illustrates, in side elevation view partially cut away and partially in section, a package in accordance with an embodiment of the present invention.
Figure 2:
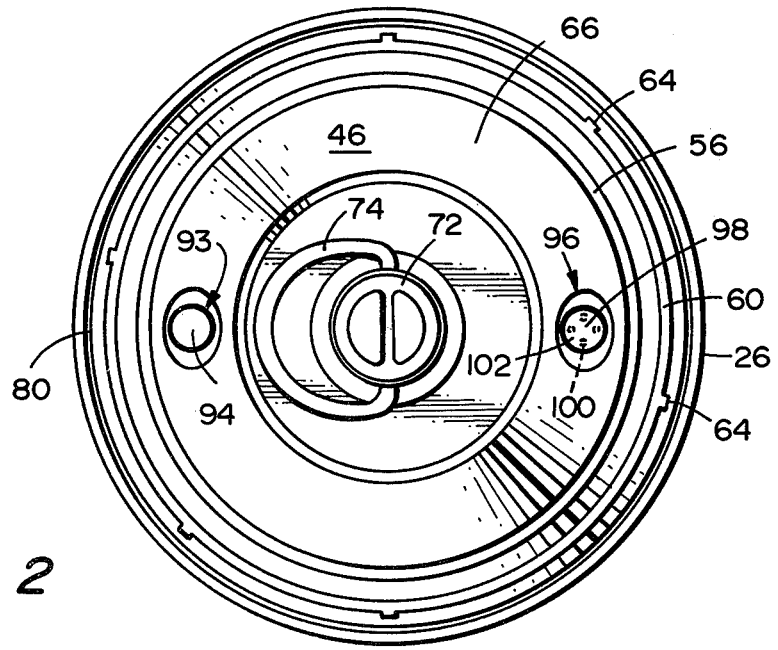
FIG. 2 illustrates a plan view of the embodiment of FIG. 1.
Figure 3:
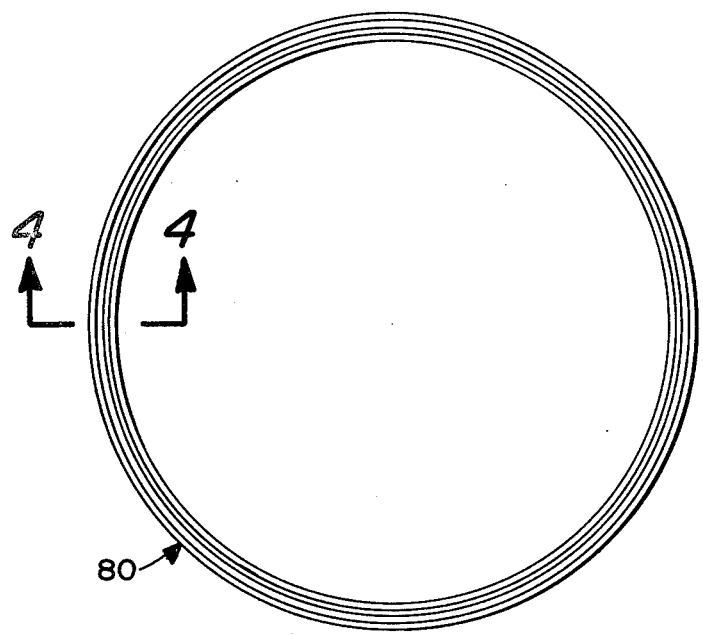
FIG. 3 illustrates a top view of a gasket useful in accordance with an embodiment of the present invention.

Adverting to FIG. 1, there is illustrated a package 10 in accordance with the present invention which is useful for storing a plurality of discs $12a$–$12z$, each separated by an appropriate spacer $14a$–$14z+1$. The designations $a$–$z$ are not meant to illustrate the presence of specifically twenty-six such discs, but are rather used only to show a plurality of such discs. The respective discs $12a$–$12z$ have respective central openings $16a$–$16z$.

A generally circular base 18 forms a part of the disc package 10. The base 18 has a bottom surface 20 which is adapted to be supported by a support surface and a top surface 22 having a peripheral portion 24 having a first peripheral wall 26 extending generally upwardly a spaced distance from the top surface 22. A second peripheral wall 28 is preferably provided generally parallel to and radially inward of the first wall 26. A central portion 30 of the base 18 generally includes a core accepting structure 32, the purpose of which is explained below.

A spindle or core 34 generally has a lower end portion 36 thereof supported by the core accepting structure 32. The core 34 also has an upper end portion 38 extending generally upwardly from the top surface 22 of the base 18. The lower end portion 36 of the core 34 is generally sealed to the circular base 18 by ultrasonic welding or some similar process. In this manner, each base 18 can be attached to a core 34 of any desired size thereby providing a package 10 which is useful for holding discs $12a$–$12z$ having different sized central openings $16a$–$16z$.

A plug 40 is generally welded within, or otherwise attached to, the inside of the upper end portion 38 of the core 34. The plug 40 has a generally centrally located threaded bore 42, the use of which will shortly be apparent.

A cover 44 also forms a part of the package 10. The cover 44 has a generally circular top 46 and a peripheral skirt 48 extending downwardly therefrom to a lower rim portion 50 adjacent the first wall 26 and generally adjacent the second wall 28. Preferably, the lower rim portion 50 is positioned radially inwardly of the first wall 26. The cover 44 further includes a projection 52 which extends downwardly about the upper end portion 38 of the core 34 and which is adapted to exert pressure, via the spacer $14a$ against the topmost $12a$ of the discs $12a$–$12z$. The pressure is generally exerted about the central opening $16a$ of the topmost $12a$ of the discs.

The central portion 30 of the base 18 includes a structure 54 which is adapted to exert pressure against the bottommost ($12z$) of the discs $12a$–$12z$, generally about the central opening $16z$, generally through the spacer $14z+1$. The discs $12a$–$12z$ are held rigidly in place between the projection 52 and the structure 54. The base 18 generally extends generally downwardly from the structure 54 to the peripheral portion 24 thereof. This provides a space 55 beneath the bottommost disc $12z$ whereby the discs $12a$–$12z$ can be easily removed upwardly and off of the core 34, when desired.

Figure 5:
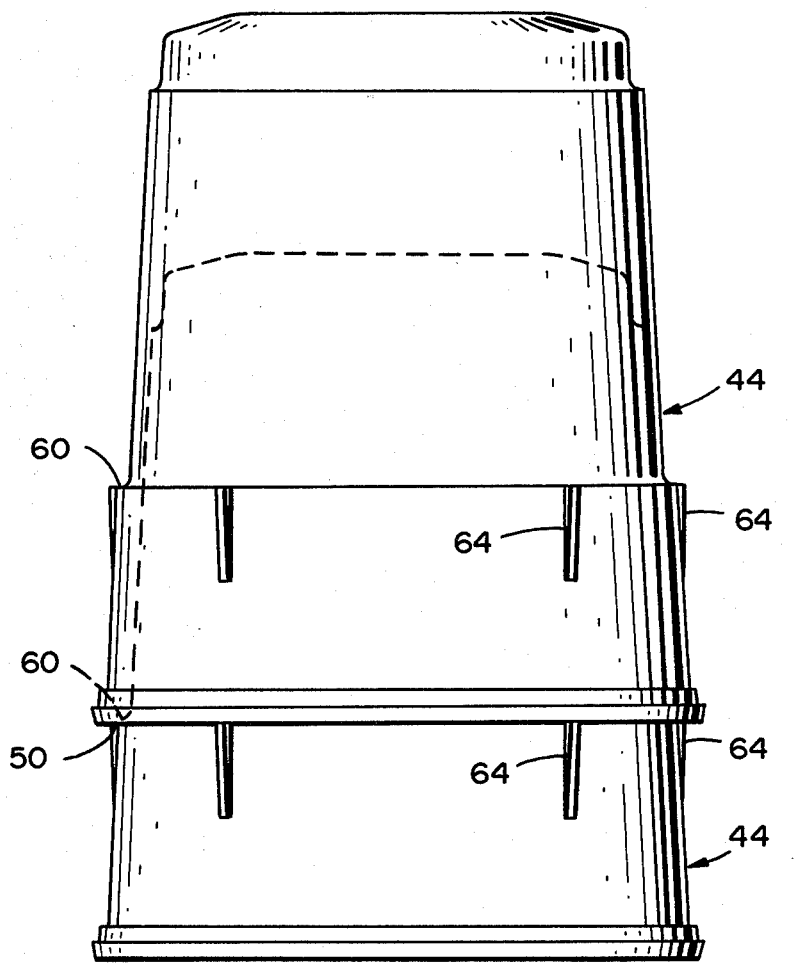
FIG. 5 illustrates a pair of covers in accordance with an embodiment of the present invention stacked together.

The cover 44 generally includes an upper shoulder 56 adjacent the circular top 46 for stacking relation with a downwardly extending ridge 58 of the base 18. The cover 44 also includes a lower shoulder 60 intermediate the upper shoulder 56 and the lower rim portion 50. The skirt 48 further includes means 62, in the embodiment illustrated a plurality of extensions 64 extending outwardly from the skirt 48 at the lower shoulder 60, for allowing stacking of a plurality of the covers 44 while preventing seizing of adjacent covers 44 to one another. FIG. 5 shows two covers 44, one stacked upon another. The extensions 64 prevent the upper cover from sliding down past the shoulder 60 whereby seizing of adjacent covers 44 is prevented. The lower shoulder 60 also serves to strengthen the cover 44, thus allowing the skirt 48 to be relatively long without the necessity of its being overly thick.

The circular top 46 generally includes a peripheral section 66 which is adapted to fit against the bottom surface 20 of the base 18 inwardly radially of the downwardly extending ridge 58. This allows a plurality of the packages 10 to be stacked up, one upon another.

Means 68 are provided for fastening the circular top 46 of the cover 44 to the upper end portion 38 of the core 34. In the particular embodiment illustrated the fastening means 68 comprises a bolt 70 having a knob 72 for easy gripping and generally also having a ring 74 which can be rotated to a vertical position and used to aid in turning the knob 72. The bolt 70 passes through an appropriate and generally gas tight opening 76 in the generally circular top 46 of the cover 44. The bolt 70 screws into the threaded bore 42 of the plug 40 which is held by the core 34. An appropriate O-ring 78 can be used to assure a leak proof seal between the bolt 70 and the top 46 of the cover 44. As the bolt 70 is tightened the cover 46 is moved downwardly relative to the core 34 and the projection 52 exerts pressure downwardly upon the spacer 14a. This provides rigid mounting for the discs 12a–12z.

Figure 4:
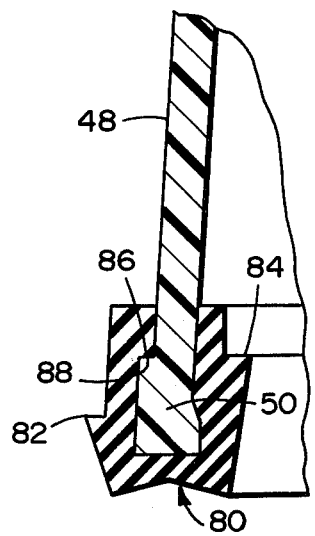
FIG. 4 illustrates, in enlarged section, the gasket of FIG. 3.

A resilient gasket 80 is removably attached to a respective one of the lower rim portion 50 of the peripheral skirt 48 and the first wall 26 and slidably sealingly bears against a respective other thereof. In the embodiment illustrated, and preferably, the gasket 80 is attached to the lower rim portion 50 and slidingly sealingly bears against the first wall 26 and the second wall 28 as well. Referring primarily to FIGS. 1 and 4, it will be seen that the gasket 80 is generally U-shaped in cross-section and includes a first sealing lip 82 in resilient pressed contact with the first wall 26 and a second sealing lip 84 in resilient pressed contact with the second wall 28. The lower rim portion 50 of the skirt 48 generally includes a step 86 which fits beneath a shoulder 88 of the gasket 80. The gasket 80 is generally made to be a quite tight fit upon the lower rim portion 50 of the skirt 48. As will be seen in FIG. 1, the lower rim portion 50 is generally positioned radially between the first wall 26 and the second wall 28 and with the gasket 80 in resilient pressed contact with both the first wall 26 and the second wall 28. This provides a very positive seal. It will be noted that a positive seal is provided between the sealing lips 82 and 84 and the respective first and second walls 26 and 28 even if the gasket 80 is not at the bottom of the canyon formed between the first and second walls 26 and 28. Thus, if the respective discs 12a–12z and/or spacers 14a–14z+1 are overly thick, whereby the lower rim portion 50 and the gasket 80 are above the bottom of the canyon between the first wall 26 and the second wall 28, perfect alignment and a positive seal are still provided. This prevents dust from entering the interior of the disc package 10. Generally, the walls 26 and 28 are made high enough and the sealing lips 82 and 84 are so placed whereby the bottom of the gasket 80 can be as much as 5 or 6 millimeters above the bottom of the canyon between the first wall 26 and the second wall 28, yet dust and/or air will not be able to enter the inside of the disc package 10.

Figure 6:
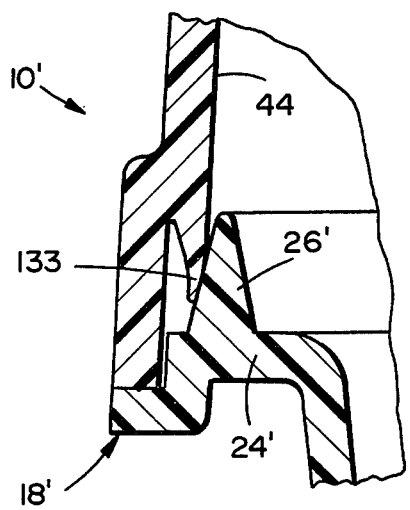
FIG. 6 illustrates, in partial view, partially in section, a prior art disc package.

For comparison, FIG. 6 shows an apparatus of the prior art wherein a plastic cover 44' is made of a butadiene-styrene copolymer which gives it some limited rubberlike properties. The degree of rubberlike properties is necessarily limited as the cover 44' must be, generally, rigid. A lip 133 is integral with the cover 44' and contacts a wall 26' which passes around the peripheral portion 24' of a generally circular base 18'. The contact is basically a line contact due to the limited rubberlike properties of the cover 44' and if the cover 44' is moved up a short distance, for example, more than about a millimeter, due to the discs stored in the disc package 10' being overly thick, then the lip 133 will no longer contact the wall 26' at all points and dust will be able to enter the package 10'.

In accordance with a preferred embodiment of the invention the package 10 includes a first port 90 and a second port 92 therethrough. In the particular embodiment illustrated, the first port 90 and second port 92 are in the cover 44 which is the most convenient place for locating them. The first port 90 is valved by utilization of valve means 93, in the embodiment illustrated a self-sealing diaphragm 94, so as to prevent flow of gas inwardly or outwardly through the first port 90. A hollow needle (not illustrated) can be inserted through the diaphragm 94 to allow dust free air or other gases to be impelled into the interior of the package 10. Alternatively, the diaphragm 94 can be replaced by appropriate valve means 93 of any nature. The second port 92 is closed by relief valve means 96. In the particular embodiment illustrated, a poppet valve 98 serves as the relief valve means 96. A plurality of small openings 100 lead from exterior of the disc package 10 to the interior thereof. A flapper portion 102 of the poppet valve 98 serves to normally close the openings 100. When there is sufficient pressure in the interior of the disc package 10, flow can occur outwardly through the small openings 100. This pressure can be provided by insertion of dust free air or any desired gas through the first port 90, for example, through a needle (not illustrated) inserted through the self-sealing diaphragm 94.

In accordance with the present invention it is preferred that the cover 48 be transparent so that the user can easily see whether a particular disc package 10 is fully loaded with discs. Also, the condition of the discs 12a–12z can thereby be observed without disturbing the disc package 10.

The material from which the base 18, the cover 44 and the core 34 is formulated can be a very rigid and tough plastic such as a polycarbonate plastic. Such plastics generally do not have serious outgassing problems and thus generally cause minimal or no damage to computer discs which may be stored in the disc package 10.

The bolt 70 can be formulated of a nonmetallic material, preferably a plastic material such as nylon, or the like. Again, a relatively low to non-outgassing material can be utilized to protect the discs 12a–12z.

The gasket 80, the diaphragm 94 and the poppet valve 98, as well, can be formulated of what is known as a "thermoplastic" rubber. Such materials can be cast like plastic but have the resiliency of an elastomer. Since they can be cast like plastic they are relatively inexpensive to formulate. Yet, they provide the needed (elastomeric) qualities for proper sealing. Such materials are readily available commercially, for example, from Shell Chemical Company, and are sold under the trademark "KRATON". They are also available from Uniroyal which sells them under the trademark "TPR". They are described in the publications "Versatile Kraton ThermoPlastic Rubber", Shell Chemical Company, Houston, Tex., and "Automotive and Mechanical Goods—Uniroyal TPR The ThermoPlastic Rubber", Uniroyal, Naugatuck, Conn. Other elastomers can also be used but they will generally be somewhat more expensive to formulate into the gasket 80.

Industrial Applicability

The present invention provides a disc package 10 for storing computer discs 12a–12z under a very controlled atmosphere, generally slightly above atmospheric pressure, whereby the discs 12a–12z can be very adequately protected from damage, corrosion, dust and other hazards.

Other advantages and attributes of the invention will be apparent from a study of the specification, the drawings, and the appended claims.

What is claimed is:

1. A disc package (10) for storing a plurality of discs (12a–12z) having central openings (16a–16z), comprising:
    a generally circular base (18) having a bottom surface (20) adapted to be supported above a support surface and a top surface (22) having a peripheral portion (24) having a peripheral wall (26) extending generally upwardly a spaced distance from the top surface (22) and a central portion (30) having a core accepting structure (32);
    a core (34) having a lower end portion (36) supported by said core accepting structure (32) and an upper end portion (38) extending generally upwardly away from said top surface (22);
    a cover (44) having a generally circular top (46) and a peripheral skirt (48) extending downwardly therefrom to a lower rim portion (50) adjacent said wall (26);
    means (68) for fastening said circular top (46) to said upper end portion (38); and
    a resilient gasket (80) removably attached to a respective one of said lower rim portion (50) and said wall (26) and slidably sealingly bearing against a respective other of said lower rim portion (50) and said wall (26).

2. A disc package (10) as set forth in claim 1, wherein said disc package (10) further includes a first port (90) and a second port (92) therethrough and further including:
    valve means (94) for normally closing said first port (90); and
    relief valve means (96) for preventing flow into said second port (92) and for allowing flow out of said second port (92) when pressure within said disc package (10) exceeds pressure external of said disc package (10).

3. A disc package (10) as set forth in claim 1, wherein said gasket (82) is attached to said lower rim portion (50).

4. A disc package (10) as set forth in claim 1, wherein said lower rim portion (50) is positioned radially inwardly of said wall (26).

5. A disc package (10) as set forth in claim 1, wherein said cover (44) further includes a projection (52) extending downwardly about said upper end portion (38) of said core (34) and being adapted to exert pressure against a topmost (12a) of said discs (12a–12z) generally about a central opening (16a) thereof.

6. A disc package (10) as set forth in claim 1, wherein said central portion (30) of said base (18) includes a structure (54) adapted to exert pressure against a bottommost (12z) of said discs (12a–12z) generally about the central opening (16z) thereof and wherein said base (18) extends generally downwardly from said structure (54) to said peripheral portion (24).

7. A disc package (10) as set forth in claim 1, wherein said cover (44) includes an upper shoulder (56) adjacent said circular top (46) and said base (18) includes a downwardly extending ridge (58) sized to fit atop said upper shoulder (56).

8. A disc package (10) as set forth in claim 7, wherein said circular top (46) includes a peripheral section (66) adapted to fit against said bottom surface (20) of said base (18) inwardly radially of said ridge (58).

9. A disc package (10) as set forth in claim 1, wherein said cover (44) includes a lower shoulder (60) intermediate said upper shoulder (56) and said lower rim portion (50), said skirt (48) including means (62) for allowing stacking of a plurality of said covers (44) while preventing seizing of adjacent covers (44) to one another.

10. A disc package (10) as set forth in claim 9, wherein said stacking allowing means (62) includes a plurality of extensions (64) extending outwardly from said skirt (48) at said lower shoulder.

11. A disc package (10) as set forth in claim 1, wherein said peripheral portion (24) has an additional peripheral wall (28) generally parallel to and radially inward of said wall (26), said gasket (80) is generally U-shaped in cross-section and is attached to said lower rim portion (50), and said lower rim portion (50) is positioned radially between said wall (26) and said additional wall (28) with said gasket (80) in resilient pressed contact with both said wall (26) and said additional wall (28).

12. A disc package (10) as set forth in claim 11, wherein said gasket (80) includes a sealing lip (82) in resilient pressed contact with said wall (26) and an additional sealing lip (84) in resilient pressed contact with said additional wall (28).

13. A disc package (10) as set forth in claim 1, wherein said cover (44) is transparent.

14. A disc package (10) as set forth in claim 1, wherein said fastening means (68) is non-metallic.

15. A package (10) for storing a plurality of discs (12a–12z) having central openings (16a–16z), comprising:
    a generally circular base (18) having a bottom surface (20) adapted to be supported by a support surface, a top surface (22) having a peripheral portion (24) and a central portion (30) having a core accepting structure (32);
    a core (34) having a lower end portion (36) supported by said core accepting structure (32) and an upper end portion (38) extending generally upwardly away from said top surface (22);
    a cover (44) having a generally circular top (46) and a peripheral skirt (48) extending downwardly therefrom to a lower rim portion adjacent said peripheral portion (24) of said base (18);
    means (68) for fastening said circular top (46) to said upper end portion (38);
    means (80) for sealing said lower rim portion (50) to said peripheral portion (24);
    a first port (90) through said disc package (10);
    a second port (92) through said disc package (10);
    valve means (93) for normally closing said first port (90); and
    relief valve means (96) for preventing flow into said second port (92) and for allowing flow out of said second port (92) when pressure within said disc package (10) exceeds pressure external of said disc package (10).

16. A disc package (10) as set forth in claim 15, wherein said valve means (93) comprises a self-sealing diaphragm (94).

17. A disc package (10) for storing a plurality of discs (12a–12z) having central openings (16a–16z), comprising:
- a generally circular base (18) having a bottom surface (20) adapted to be supported by a support surface, a top surface (22) having a peripheral portion (24) and a central portion (30) having a core accepting structure (32);
- a core (34) having a lower end portion (36) supported by said core accepting structure (32) and an upper end portion (38) extending generally upwardly away from said top surface (22);
- a cover (44) having a generally circular top (46) and a peripheral skirt (48) extending downwardly therefrom to a lower rim portion (50) adjacent said peripheral portion (24), said cover (44) including an upper shoulder (56) adjacent said circular top (46) and a lower shoulder (60) intermediate said upper shoulder (56) and said lower rim portion (50), said skirt (48) including means (62) for allowing stacking of a plurality of said covers (44) while preventing seizing of adjacent covers (44) to one another;
- means (68) for fastening said circular top (46) to said upper end portion (38); and
- means (80) for sealing said lower rim portion (50) to said peripheral portion (24).

18. A disc package (10) as set forth in claim 17, wherein said stacking allowing means (62) includes a plurality of extensions (64) extending outwardly from said skirt (48) at said lower shoulder.

* * * * *

UNITED STATES PATENT AND TRADEMARK OFFICE
CERTIFICATE OF CORRECTION

PATENT NO. : 4,434,891
DATED : March 6, 1984
INVENTOR(S) : James R. Skinner and Robert G. Atwood It is certified that error appears in the above-identified patent and that said Letters Patent is hereby corrected as shown below:

On the title page, item [73] should read:

-- [73] Assignees: M.U. Engineering & Mfg., Inc.,
Mountain View, Calif. and
Bozley, Inc., Redwood City, Calif. --

Signed and Sealed this

Thirtieth Day of July 1985

[SEAL]

Attest:

DONALD J. QUIGG

Attesting Officer

Acting Commissioner of Patents and Trademarks